(12) United States Patent
Yoon et al.

(10) Patent No.: US 9,224,989 B2
(45) Date of Patent: Dec. 29, 2015

(54) RECHARGEABLE BATTERY AND MODULE THEREOF

(75) Inventors: Hee-Soo Yoon, Yongin-si (KR);
Sung-Hoon Kim, Yongin-si (KR);
Gun-Ho Kwak, Yongin-si (KR);
Yong-Sam Kim, Yongin-si (KR);
Jang-Hyun Song, Yongin-si (KR)

(73) Assignees: SAMSUNG SDI CO., LTD., Yongin-si, Gyeonggi-do (KR); ROBERT BOSCH GmbH, Stuttgart (DE)

( * ) Notice: Subject to any disclaimer, the term of this patent is extended or adjusted under 35 U.S.C. 154(b) by 914 days.

(21) Appl. No.: 13/426,728

(22) Filed: Mar. 22, 2012

(65) Prior Publication Data

US 2013/0095369 A1    Apr. 18, 2013

(30) Foreign Application Priority Data

Oct. 12, 2011    (KR) .......................... 10-2011-0104034

(51) Int. Cl.
*H01M 2/30*    (2006.01)
*H01M 2/02*    (2006.01)
*H01M 2/20*    (2006.01)

(52) U.S. Cl.
CPC ............ *H01M 2/0237* (2013.01); *H01M 2/206* (2013.01); *H01M 2/305* (2013.01)

(58) Field of Classification Search
CPC ..... H01M 2/202; H01M 2/203; H01M 2/204; H01M 2/205; H01M 2/206; H01M 2/021; H01M 2/0217; H01M 2/0473; H01M 2/06; H01M 2/30
See application file for complete search history.

(56) References Cited

U.S. PATENT DOCUMENTS

| 6,270,378 | B1 | 8/2001 | Lee |
| 8,309,246 | B2 * | 11/2012 | Lee et al. ...................... 429/121 |
| 2008/0070067 | A1 | 3/2008 | Jang et al. |
| 2011/0117426 | A1 | 5/2011 | Choi et al. |
| 2011/0244310 | A1 * | 10/2011 | Kim .............................. 429/158 |
| 2011/0274963 | A1 * | 11/2011 | Bae ............................... 429/152 |

FOREIGN PATENT DOCUMENTS

| KR | 2001-0003367 | 1/2001 |
| KR | 10-2008-0025437 | 3/2008 |
| KR | 10-2011-0054705 | 5/2011 |

* cited by examiner

*Primary Examiner* — Ula C Ruddock
*Assistant Examiner* — Thomas Parsons
(74) *Attorney, Agent, or Firm* — Lee & Morse, P.C.

(57) ABSTRACT

The rechargeable battery includes an electrode assembly; a case, the case retaining the electrode assembly; a cap plate coupled to an opening of the case; and an electrode terminal coupled to the cap plate and electrically connected to the electrode assembly, wherein the electrode terminal includes a terminal fixing portion coupled to an upper surface of the cap plate, the terminal fixing portion including a guide portion, a terminal portion coupled to the terminal fixing portion, and the guide portion is configured to facilitate slidable movement of the terminal portion in a single direction.

20 Claims, 9 Drawing Sheets

RECHARGEABLE BATTERY AND MODULE THEREOF

BACKGROUND

1. Field

The described technology relates generally to a rechargeable battery and a module thereof.

2. Description of the Related Art

A rechargeable battery, unlike a primary battery, repeatedly performs charge and discharge. A small-capacity rechargeable battery is used in a portable small-sized electronic device such as a mobile phone, a notebook computer, and a camcorder and a large-capacity rechargeable battery may be used as a power supply for driving a motor such as a hybrid vehicle.

For example, the rechargeable battery may include an electrode assembly provided with electrodes at both sides of a separator, a case receiving the electrode assembly, a cap plate coupled to an opening of the case, and electrode terminals provided in the cap plate and connected to the electrodes through lead tabs.

The electrode terminal may include a rivet terminal coupled to a terminal hole of the cap plate, a plate terminal connected to the rivet terminal, and a bolt terminal connected to the plate terminal. For example, a bus bar may be installed in the bolt terminal and fixed by a nut to thereby connect a plurality of rechargeable batteries in series or in parallel.

The above information disclosed in this Background section is only for enhancement of understanding of the background of the described technology and therefore it may contain information that does not form the prior art that is already known in this country to a person of ordinary skill in the art.

SUMMARY

One or more embodiments may provide a rechargeable battery, including: an electrode assembly; a case, the case retaining the electrode assembly; a cap plate coupled to an opening of the case; and an electrode terminal coupled to the cap plate and electrically connected to the electrode assembly, wherein the electrode terminal includes a terminal fixing portion coupled to an upper surface of the cap plate, the terminal fixing portion including a guide portion, a terminal portion coupled to the terminal fixing portion, and the guide portion is configured to facilitate slidable movement of the terminal portion along a single direction.

The terminal fixing portion may further include a body portion on an insulator, the insulator being on the cap plate. The guide portion may include first portions protruding upward from opposing, upper lateral edges of the body portion and second portions extending from the first portions toward a center of the body portion. The guide portion may be configured to facilitate slidable movement of a lower end of the terminal portion.

The terminal portion may include a plate portion coupled to the guide portion on the body portion, and a bolt portion protruding from the plate portion.

The body portion may include a first length extending in a length direction of the cap plate, and a second length extending in a width direction of the cap plate and being longer than the second length, the width direction intersecting the length direction. The guide portion may extend along the length direction of the cap plate.

The plate portion may include two pairs of opposing sides, each side of the plate portion being shorter than the first length of the body portion. The plate portion may be a square. A weld may be provided on opposing second portions of the guide portion and corresponding positions of an upper surface of the plate portion. The plate portion may be rectangular. A length of the plate portion may be longer than the first length of the body portion. The plate portion may include a pair of bendable end portions, the bendable end portions being configured to engage opposing side surfaces of the body portion. The plate portion may include one bendable end portion, the bendable end portion being configured to engage a corresponding side surface of the body portion. The plate portion may include a welding end, the welding end opposing the bendable end portion, the welding end including a weld for connecting the plate portion to a corresponding one of the second portions. The bolt portion and the plate portion may have different centers. The second portions of the guide portion may have different lengths.

One or more embodiments may provide a rechargeable battery module, including: a plurality of unit cells formed of rechargeable batteries, and a bus bar connecting electrode terminals of neighboring unit cells, wherein the electrode terminal includes a terminal fixing portion on the unit cell and a terminal portion coupled to the terminal fixing portion, the terminal portion being slidably movable in a length direction of the unit cell on the terminal fixing portion, and the bus bar is disposed on the terminal fixing portion and coupled with the terminal portion.

The neighboring unit cells may have a first distance between corresponding end portions of the respective unit cells. A center line of the bus bar may be in alignment with a center of a terminal portion of one unit cell and is not in alignment with a center of a terminal portion of a neighboring unit cell. The center line of the bus bar may be spaced a second distance from a center of the terminal fixing portion of the neighboring unit cell. The terminal fixing portion may include a guide portion on a body portion, (the guide portion including first portions protruding upward from opposing, upper lateral edges of the body portion), and second portions extending toward a center of the body portion (the guide portion being configured to facilitate slidable movement of the terminal portion in a single direction), the terminal portion including a bolt portion (the bolt portion coupled to the guide portion and protruding outside of the rechargeable battery from the plate portion), and a nut disposed around the bolt portion on the bus bar and the guide portion.

BRIEF DESCRIPTION OF THE DRAWINGS

Features will become apparent to those of ordinary skill in the art by describing in detail exemplary embodiments with reference to the attached drawings in which.

DETAILED DESCRIPTION

Figure 1:
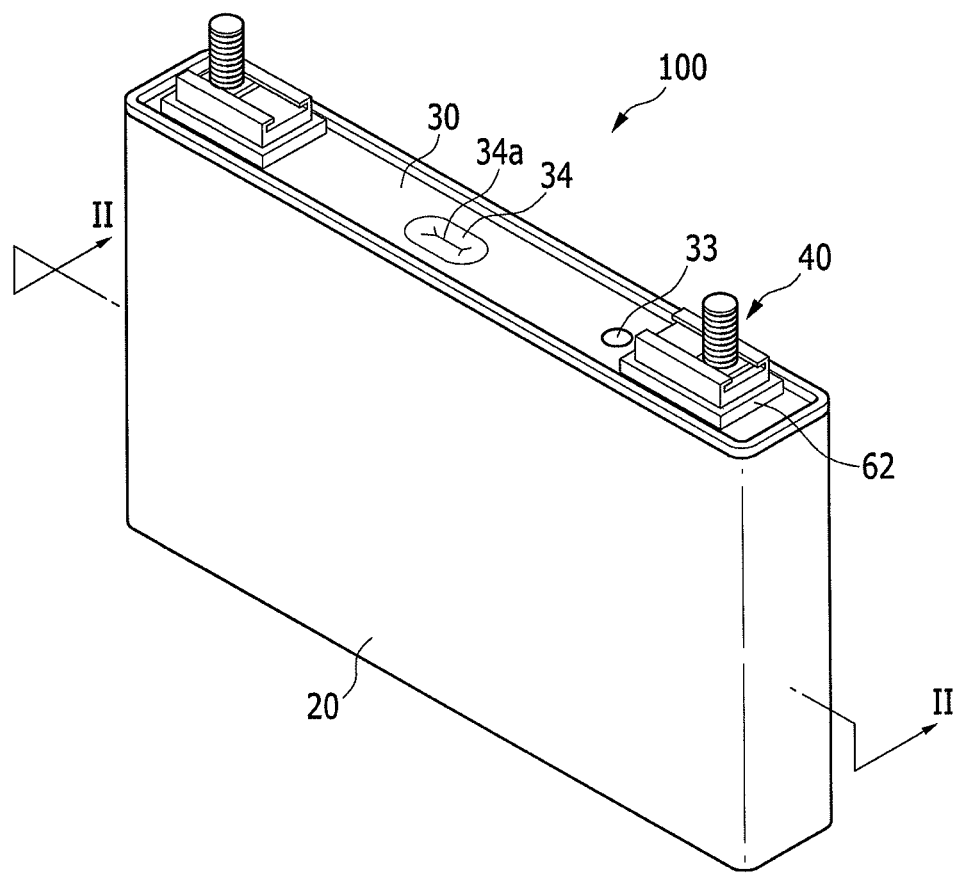
FIG. 1 illustrates a perspective view of a rechargeable battery according to a first exemplary embodiment.

Korean Patent Application No. 10-2011-0104034, filed on Oct. 12, 2011, in the Korean Intellectual Property Office, and entitled: "Rechargeable Battery and Module Thereof," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

Figure 2:
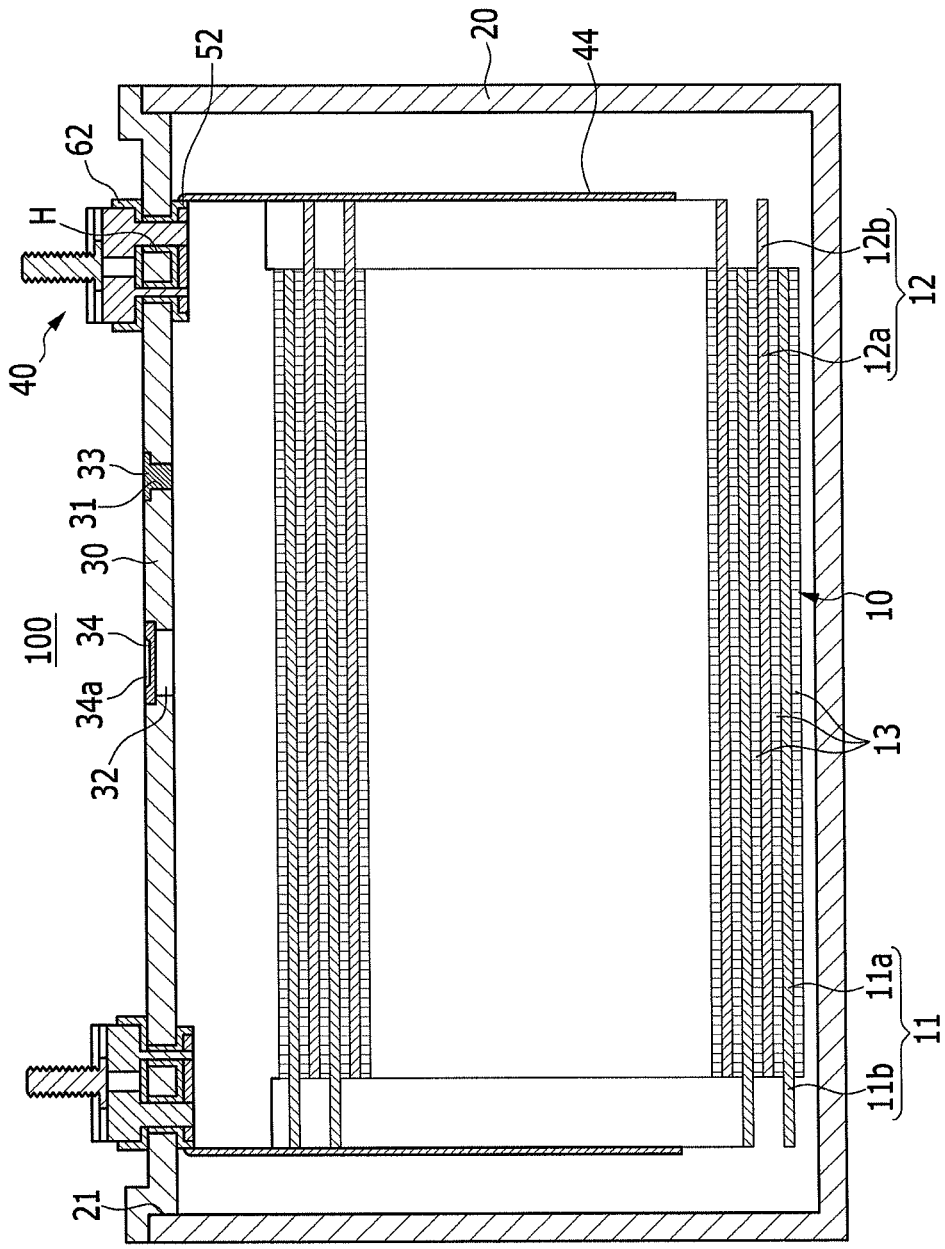
FIG. 2 illustrates a cross-sectional view of FIG. 1, taken along the line II-II.

FIG. 1 illustrates a perspective view of a rechargeable battery 100 according to a first exemplary embodiment. FIG. 2 illustrates a cross-sectional view of FIG. 1, taken along the line II-II. Referring to FIG. 1 and FIG. 2, the rechargeable battery 100 according to the first exemplary embodiment may include an electrode assembly 10 that iteratively performs charging and discharging, a case 20 retaining an electrolyte solution with the electrode assembly 10, a cap plate 30 coupled to an opening 21 of the case 20, and electrode terminals 40 provided in, e.g., extending through, the cap plate 30.

In an implementation, the electrode assembly 10 may include electrodes, for example, a negative electrode 11 and a positive electrode 12 disposed at opposing sides of a separator 13, which may be an electric insulator. The electrode assembly 10 may be formed by winding the negative electrode 11, the separator 13, and the positive electrode 12 in a jelly roll configuration.

Further, the electrode assembly may be assembled by laminating a negative electrode and a positive electrode, each of which may include a single plate. The separator may be interposed between the negative electrode and the positive electrode. According to some embodiments, the electrode assembly may be assembled by bending and laminating the negative electrode, the separator, and the positive electrode, to achieve a zigzag configuration (not shown).

The negative and positive electrodes 11 and 12 may include coated regions 11a and 12a and uncoated regions 11b and 12b. The coated regions 11a and 12a may be formed by coating an active material (not shown) on each of a plurality of current collectors. The uncoated regions 11b and 12b may include exposed portions of the current collector, adjacent the coated regions 11a and 12a, respectively, which are not coated with the active material. In an implementation, the current collector of the negative electrode 11 may include a copper thin film and the current collector of the positive electrode 12 may include an aluminum thin film.

The uncoated region 11b of the negative electrode 11 may be at one end of the negative electrode 11, along, e.g., outside, the coated region 11a of the wound negative electrode 11. The uncoated region 12b of the positive electrode 12 may be formed at one end of the positive electrode 12 along, e.g., outside, the coated region 12a of the wound positive electrode 12. In an implementation, the uncoated regions 11b and 12b may be respectively disposed at lateral, e.g., outer, ends of the electrode assembly 10 for electric connection of the electrode terminal 40 to the electrode assembly 10.

The case 20 may include an opening 21 at one side thereof. The electrode assembly 10 may be inserted into the case 20 through the opening 21. The case 20 may have a cuboidal shape and may include a receiving space for retaining the electrode assembly 10 and the electrolyte solution.

The cap plate 30 may be coupled with the opening 21 of the case 20. Thus, the cap plate 30 may close the receiving space of the case 20. According to some embodiments, the case 20 and the cap plate 30 may include aluminum and may be welded together. A welding property may be improved when the case 20 and the cap plate 30 include the same material.

The cap plate 30 may have an electrolyte injection opening 31 and a vent hole 32. The electrolyte injection opening 31 may enable the electrolyte solution to be injected into the case 20. After injection of the electrolyte solution, the electrolyte injection opening 31 may be sealed with a sealing cap 33.

The vent hole 32 may be closed and sealed by a vent plate 34. The vent plate 34 may be welded to the cap plate 30 to prevent explosion of the rechargeable battery by emitting internal gas generated due to charging and discharging of the rechargeable battery 100 to the outside. When an internal pressure of the rechargeable battery reaches a predetermined level, the vent plate 34 may be ruptured. A notch 34a may be formed in the vent plate 34 to induce a rupture of the vent plate 34.

The cap plate 30 may have a terminal through-hole H to facilitate electrical connection of components inside and outside of the case 20. The electrode terminal 40 may include a negative terminal and a positive terminal that are equivalent to each other. In an implementation, the electrode terminal 40 may be provided in the terminal hole H of the cap plate 30 and connected to the electrode assembly 10 through a lead tab 44 having conductivity.

The rechargeable battery 100 may include an insulator 62 disposed between external surfaces of the electrode terminal 40, e.g., surfaces of the electrode terminal 40 outside of the case 20, and the cap plate 30. The insulator 62 may provide electrical insulation for the electrode terminal 40 and the cap plate 30. A gasket 52 may be provided between internal surfaces of the electrode terminal 40, e.g., surfaces of the electrode terminal 40 inside of the case 20, and the cap plate 30 for electric insulation and sealing therebetween. The gasket 52 may be inserted into the terminal hole H to further electrically insulate the electrode terminal 40 and the terminal hole H.

Figure 3:
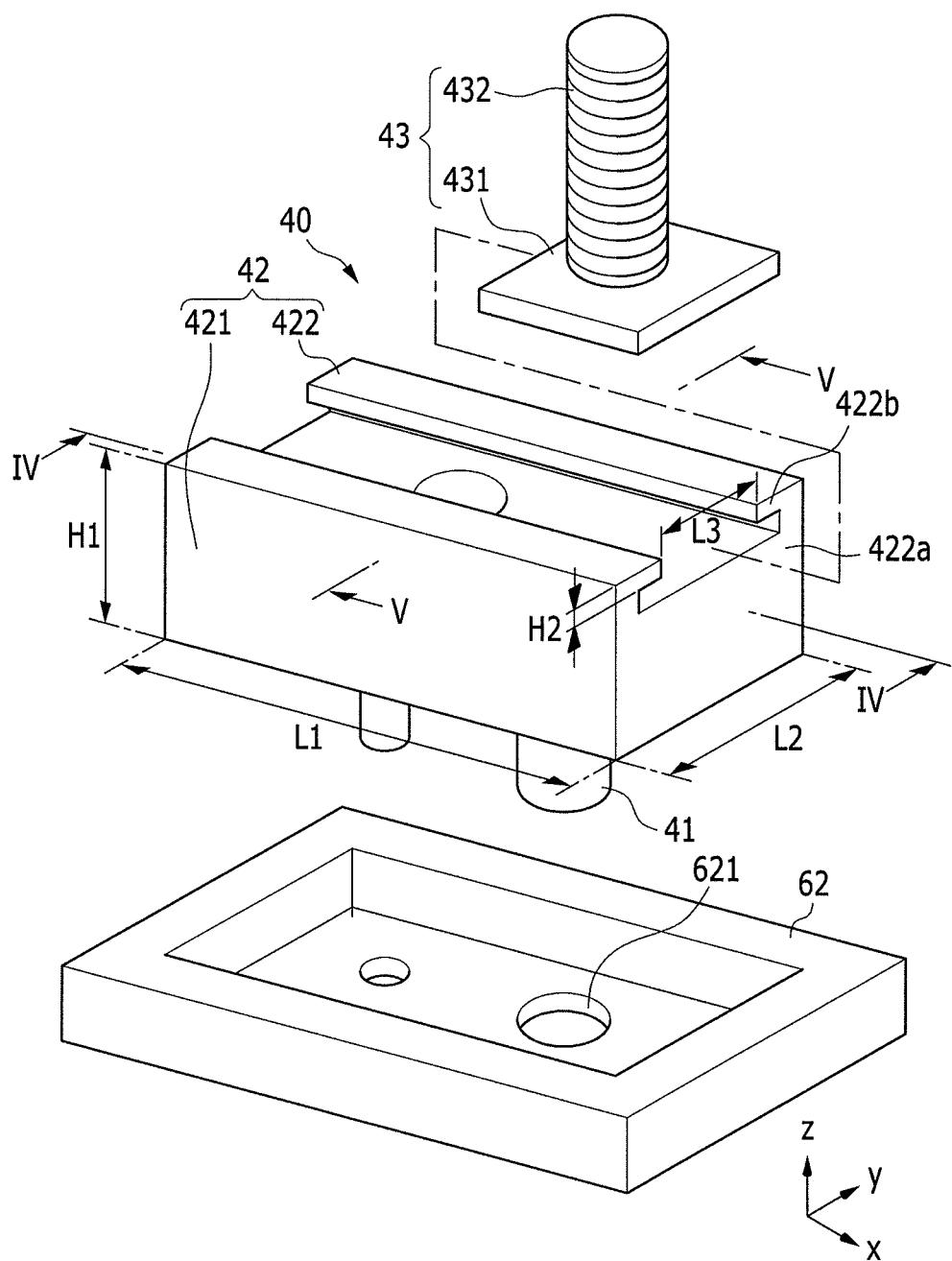
FIG. 3 illustrates an exploded perspective view of an electrode terminal.
Figure 4:
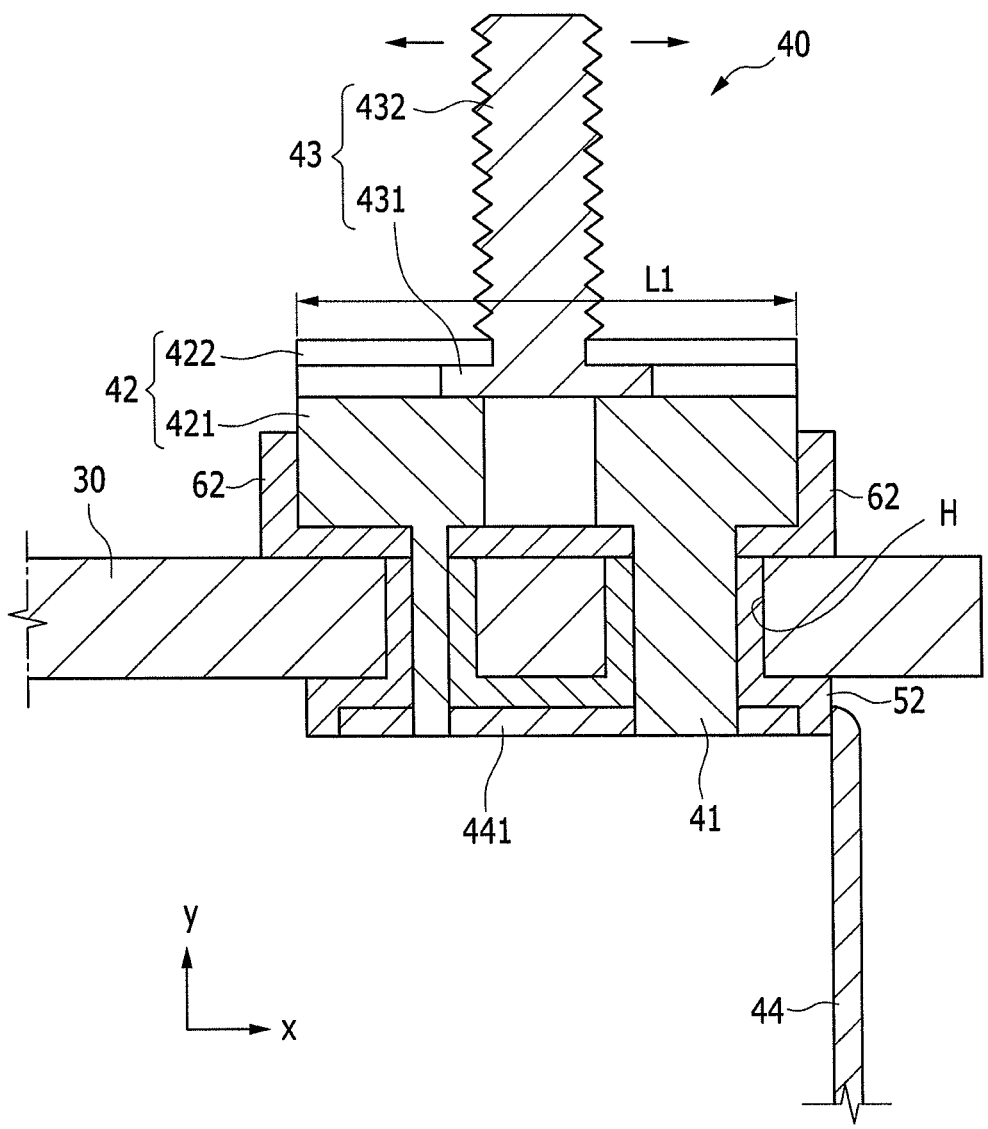
FIG. 4 illustrates a cross-sectional view of an assembled electrode terminal of FIG. 3, taken along the line IV-IV.

FIG. 3 illustrates an exploded perspective view of the electrode terminal 40. FIG. 4 illustrates a cross-sectional view of the assembled electrode terminal 40 of FIG. 3, taken along the line IV-IV. Referring to FIG. 3 and FIG. 4, the electrode terminal 40 may include a terminal fixing portion 42 (hereinafter, referred to as a plate terminal) coupled to the cap plate 30 and a terminal portion 43 (hereinafter, referred to as a bolt terminal) coupled to an outer side of the plate terminal 42. The electrode terminal 40 may further include a rivet terminal 41 formed on an inner side, e.g., a lower surface, of the plate terminal 42.

The plate terminal 42 may be disposed on an external surface, e.g. an upper surface, of the cap plate 30. The plate terminal 42 may be electrically insulated from the cap plate 30 by the insulator 62, which may be between the cap plate 30 and the plate terminal 42. The bolt terminal 43 may be coupled to the plate terminal 42. According to some embodiments, the bolt terminal 43 may slide into the plate terminal 42, in a length direction (x-axis direction) of the cap plate 30.

The rivet terminal 41 may be integrally formed with a lower surface of the plate terminal 42 (in FIG. 3 and FIG. 4). The rivet terminal 41 may be inserted into a through-hole 621 of the insulator 62 and the terminal hole H to secure the electrode terminal 40 to the cap plate 30.

The rivet terminal 41 may be electrically insulated from the cap plate 30 by the gasket 52, which may inserted into the terminal hole H and electrically connected to a lead tab 44 through a bonded portion 441.

The lead tab 44 may include a material that is also included in the rivet terminal 41 (i.e., aluminum or cooper). The lead tab 44 may be electrically coupled to the electrode terminal 40 by a bonded portion 441. The bonded portion 441 may be coupled to a lower end of the rivet terminal and the lower end of the rivet terminal 41 may then be caulked.

In manufacturing a rechargeable battery module 200 (refer to FIG. 9), the bolt terminal 43 may be slid into the plate terminal 42 to facilitate coupling of the bolt terminal 43 with the plate terminal 42. The bolt terminal 43 may draw out, e.g., connect, the electrode assembly 10 to a component outside of the case 20. In an implementation, the positive electrode of the electrode assembly 10 may be electrically connected to the bolt terminal 43 via the lead tab 44, the rivet terminal 41, and the plate terminal 42.

The plate terminal 42 may include a body portion 421 provided on the external or upper surface of the cap plate 30, e.g., outside of the case 20. The insulator 62 may be on the external surface, e.g., upper surface, of the cap plate 30. For example, the insulator 62 may be between the body portion 421 and the cap plate 30. A guide portion 422 may be formed in the body portion 421.

The body portion 421 may be in the shape of a cuboid having a first length L1 extending in a length direction (x-axis direction) of the cap plate 30, a second length L2 extending in a width direction (y-axis direction) of the cap plate 30, and a height H1 extending in the z-axis direction. The width direction (y-axis direction) may intersect the length direction (x-axis direction).

The first length L1 may be larger than the second length L2. As such, the body portion 421 may have a cuboidal shape that is longer in the x-axis direction than in the y-axis direction. Thus, the guide portion 422 may extend along the x-axis direction between opposing ends of the body portion 421 (in the y-axis direction). The first length L1 may define a movement range in the x-axis direction for the bolt terminal 43.

The guide portion 422 may be configured to receive the bolt terminal 43. The guide portion 422 may facilitate movement of the bolt terminal 43 along the length direction (x-axis direction) of the cap plate 30, so that the bolt terminal 43 may be coupled to the body portion 421 at a desired position.

In an implementation, the guide portion 422 may include a groove within which a portion of the bolt terminal 43 may be retained. As such, the guide portion 422 may include opposing, parallel first portions 422a that protrude upward at a height H2 from opposing, upper lateral edges (z-axis direction) of the body portion 421, and opposing, parallel, second portions 422b that extend from the first portions (y-axis direction) toward the center of the body portion 421 such that an opening having a third length L3 is formed between the second portions 422b. The guide portion 422 may extend along the length direction (x-axis direction) of the cap plate 30, e.g., may extend entirely along the length L1 of the body portion 421. The guide portion 422 may facilitate slidable movement of the lower end of the bolt terminal 43 on the body portion 421 during installation of the bolt terminal 43. The lower end of the bolt terminal 43 may be coupled and fixed to the body portion 421.

The bolt terminal 43 may include a plate portion 431 and a bolt portion 432 protruding from the plate portion 431. The plate portion 431 may be at a lower end of the bolt portion 432. The bolt terminal 43 may be coupled to the guide portion 422 on the body portion 421. The bolt portion 432 may include a thread. In an implementation, a position of the bolt portion 432 may be set by slidably moving the plate portion 431 within the guide portion 422 in the x-axis direction.

The plate portion 431 may have two pairs of opposing sides. Each side of the plate portion 431 may be shorter than the first length L1 of the body portion 421. Each side of the plate portion 431 may be longer than the third length L3. In an implementation, all sides may have the same length such that the plate portion 431 is square. A thickness of the plate portion may be less than the height H2. The plate portion 431 may be installed within the guide portion 422 and may be guided by the guide portion 422 to move along the x-axis direction. When the bolt portion 432 is positioned on the body portion 431, the plate portion 431 may not protrude beyond an edge of the body portion 421.

Figure 5:
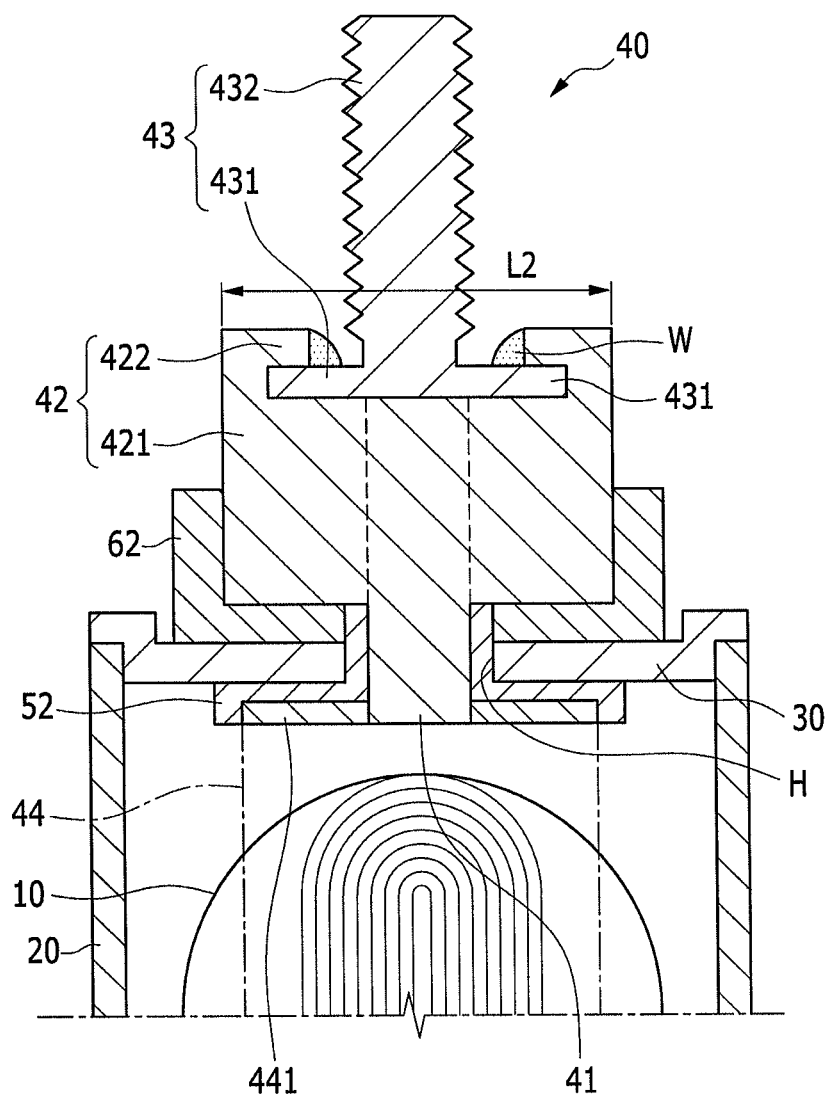
FIG. 5 illustrates a cross-sectional view of the assembled electrode terminal of FIG. 3, taken along the line V-V.

FIG. 5 illustrates a cross-sectional view of the assembled electrode terminal 40 of FIG. 3, taken along the line V-V. Referring to FIG. 5, once at the desired position within the guide portion, the plate portion 431 may be fixed to the guide portion 422 by welding W. For example, opposing second portions of the guide portion 422 may be welded to an upper surface of corresponding positions of the plate portion 431.

The welded W structure of the plate portion 431 and the guide portion 422 may improve a fastening force therebetween and reduce electric resistance between the body portion 421 of the plate terminal 42 and the plate portion 431 of the bolt terminal 43. According to some embodiments, the plate portion may be fastened to the guide portion by tight-fitting or caulking, and the plate portion and the guide portion may not be welded (not shown).

Figure 6:
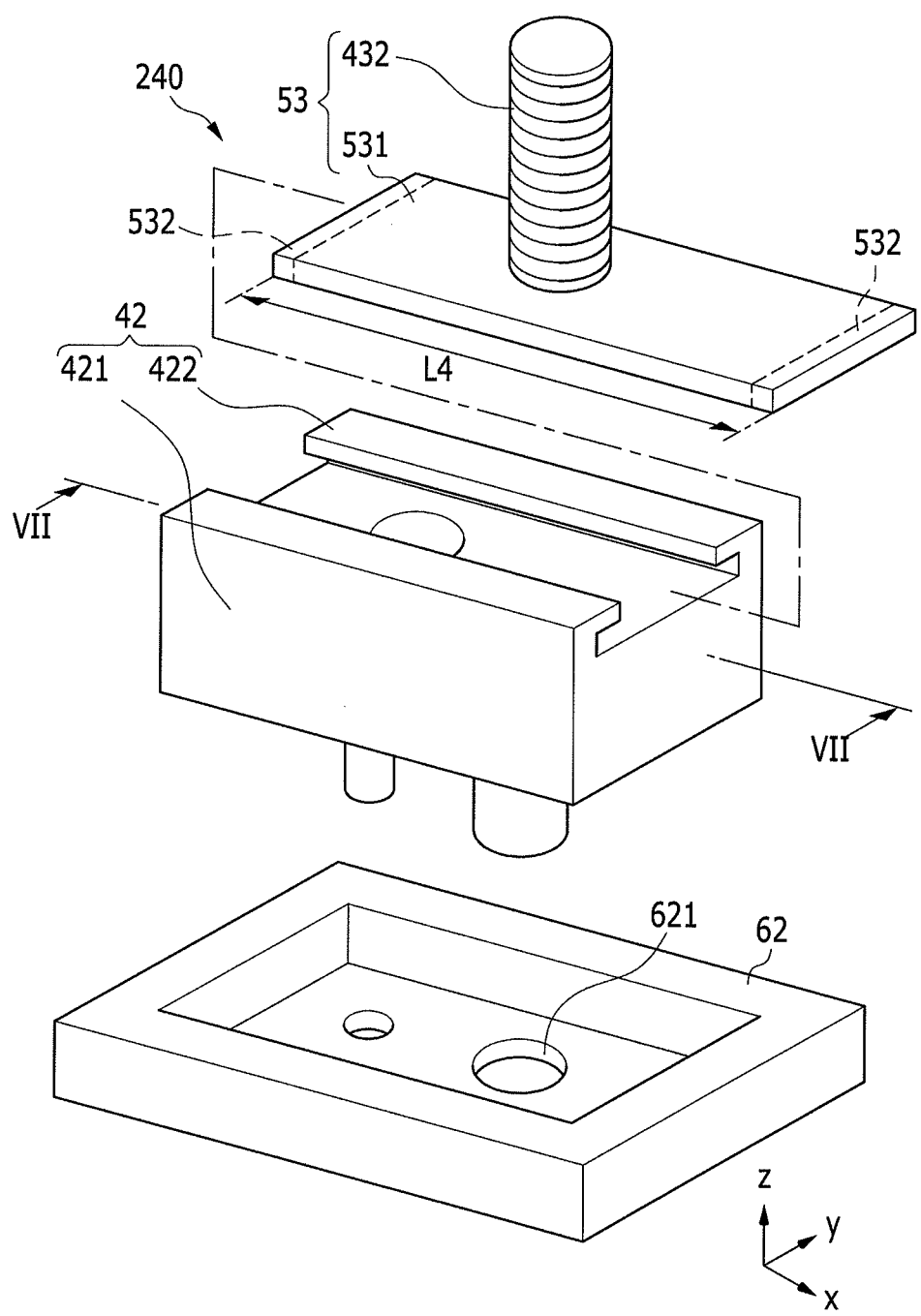
FIG. 6 illustrates an exploded perspective view of an electrode terminal applied to a rechargeable battery according to a second exemplary embodiment.
Figure 7:
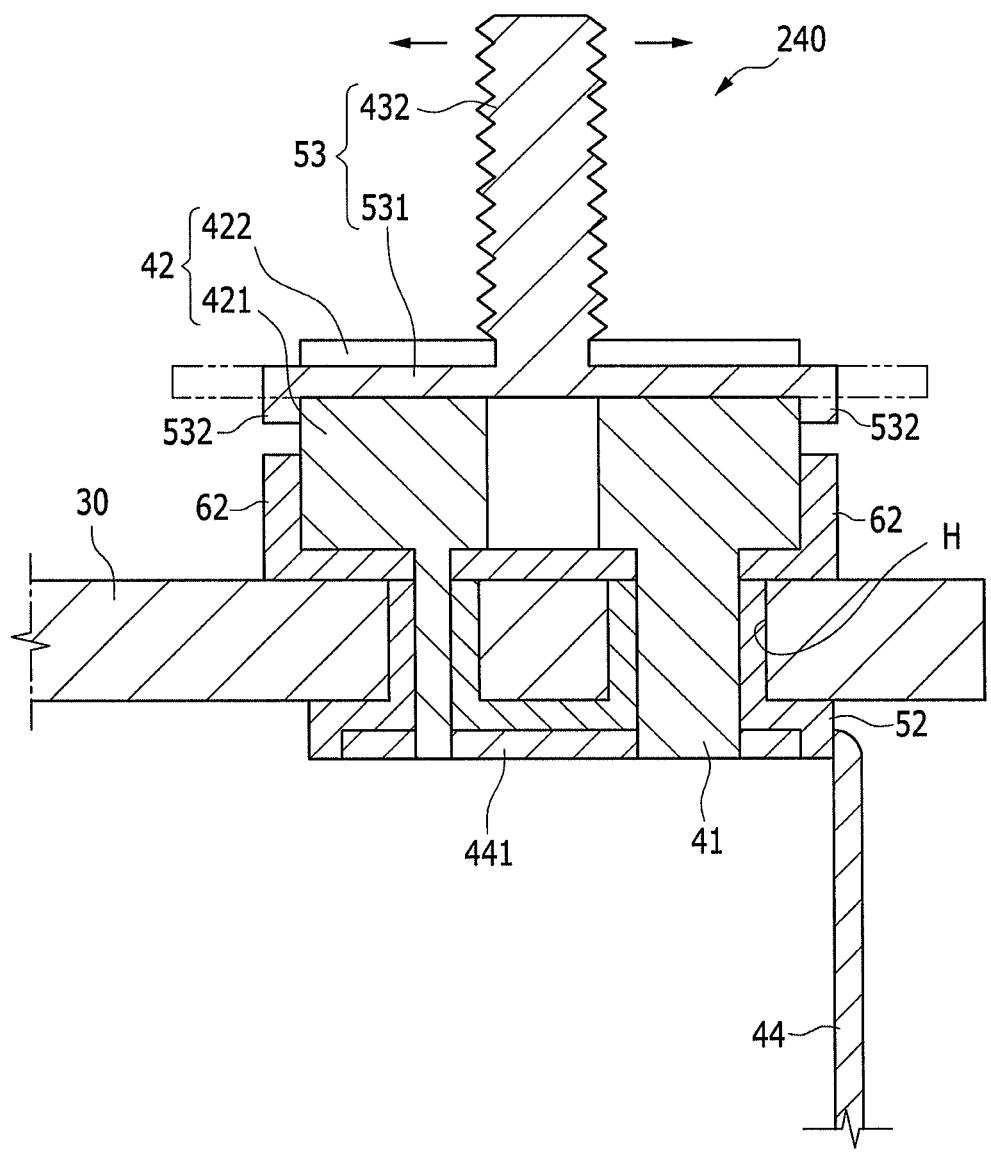
FIG. 7 illustrates a cross-sectional view of an assembled electrode terminal of FIG. 6, taken along the line VII-VII.

FIG. 6 illustrates an exploded perspective view of an electrode terminal 240 applied to a rechargeable battery according to a second exemplary embodiment. FIG. 7 illustrates a cross-sectional view of an assembled electrode terminal of FIG. 6, taken along the line VII-VII.

Referring to FIG. 6 and FIG. 7, in a bolt terminal 53, a plate portion 531 may have a fourth length L4 that is longer than the first length L1 of a body portion 421 along the X-axis direction, e.g., the plate portion 531 may be rectangular. The plate portion 531 may be moved in the x-axis direction on the body portion 421 to set a position of the bolt portion 432. Opposing, parallel long sides of the plate portion 531 may define the fourth length L4. The plate portion 531 may be installed within the guide portion 422. The plate portion 531 may include bendable end portions 532, i.e., short sides, which extend between and connect the long sides of the plate portions 531. The bendable end portions 532 may extend past opposing edges of the body portion 421 once the plate portion 531 is positioned within the guide portion, and engage opposing side surfaces of the body portion 421. The plate portion 531 may be fixed to the opposing side surfaces of the body portion 421 through the bendable end portions 532, which may extend along the y-axis direction of the plate portion 531. Connection between the bendable end portions 532 and the body portion 421 may further reduce electric resistance of the body portion 421 and the bolt portion 432.

The bending capability of the bendable end portions 532 of the plate portion 531 with respect to the body portion 421, may simplify coupling and fixing of the bolt terminal 53 having the plate portion 531 and the plate terminal 42 having the body portion 421. According to some embodiments, the bendable end portions 532 may be welded to corresponding positions of the guide portion (not shown).

Figure 8:
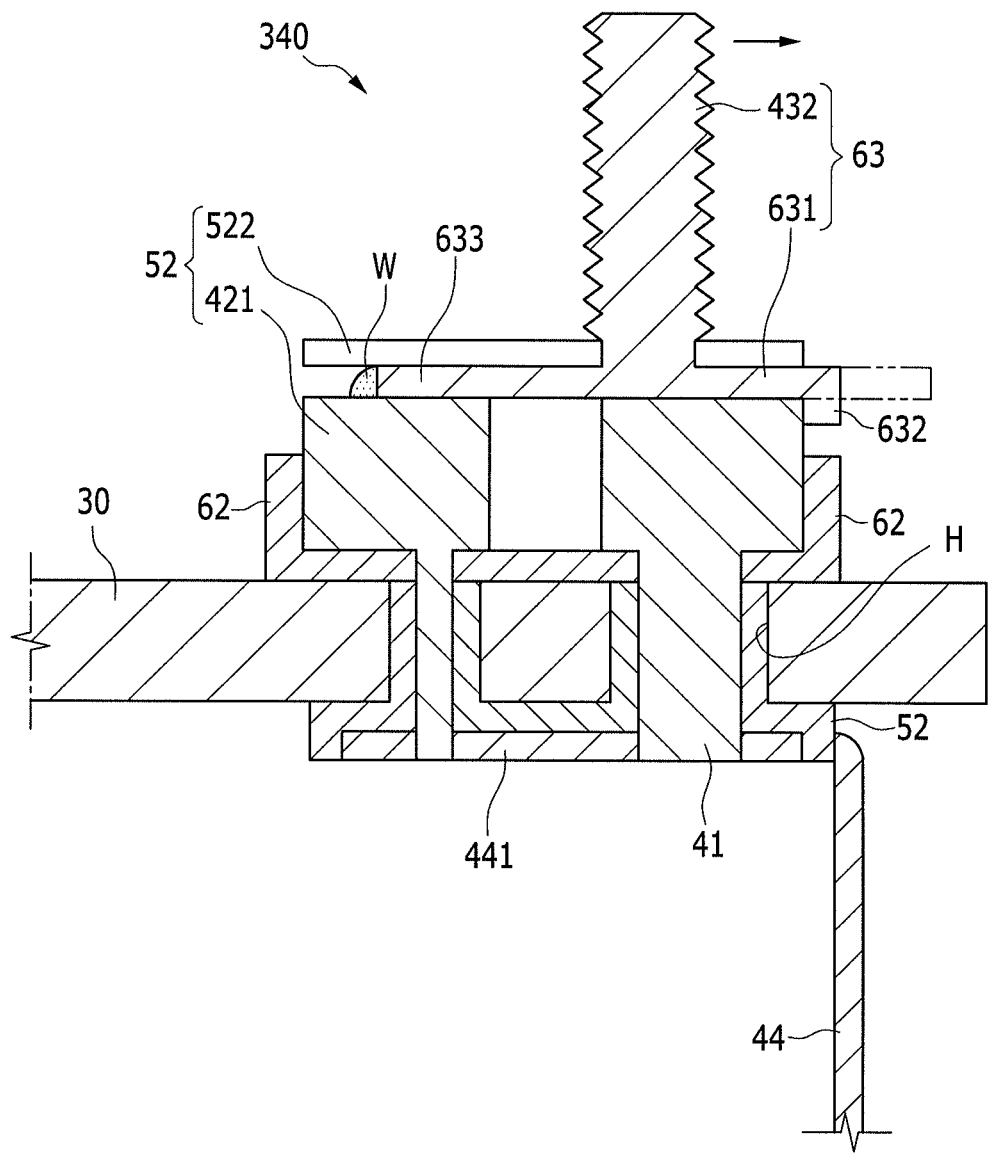
FIG. 8 illustrates a cross-sectional view of an electrode terminal applied to a rechargeable battery according to a third exemplary embodiment.

FIG. 8 illustrates a cross-sectional view of an electrode terminal 340 applied to a rechargeable battery according to a third exemplary embodiment. Referring to FIG. 8, in a bolt terminal 63, a bendable end portion 632 of a plate portion 631 may be bent to contact and engage a side surface of the body portion 421 of a plate terminal 52. Connection between the end portion 632 and the body portion 421 may further reduce electric resistance of the body portion 431 and the bolt portion 432.

The bending capability of the end portion 632 of the plate portion 631 with respect to the body portion 421 may simplify coupling and fixing of the bolt terminal 63 having the plate portion 631 and the plate terminal 52 having the body portion 421. A welding end portion 633, e.g. opposing the bendable end portion 632, may be welded to an upper surface of the body portion 421, corresponding in position to the position of the welding end portion 631. Thus, according to the third exemplary embodiment, electric resistance between the body portion 421 and the bolt portion 432 may be reduced and a fastening force between the plate terminal 52 and the bolt terminal 63 may be increased.

Also, as illustrated in FIG. 8, a guide portion 522 does not need to be symmetrical relative to a center of the body portion 421, i.e., opposing parallel second portions of the guide portion 522 may have different lengths along the y-direction, and the plate portion 631 does not need to be symmetrical relative to the position of the bolt portion 432, i.e., a center of the bolt portion 432 may be different from a center of the plate portion 631.

Figure 9:
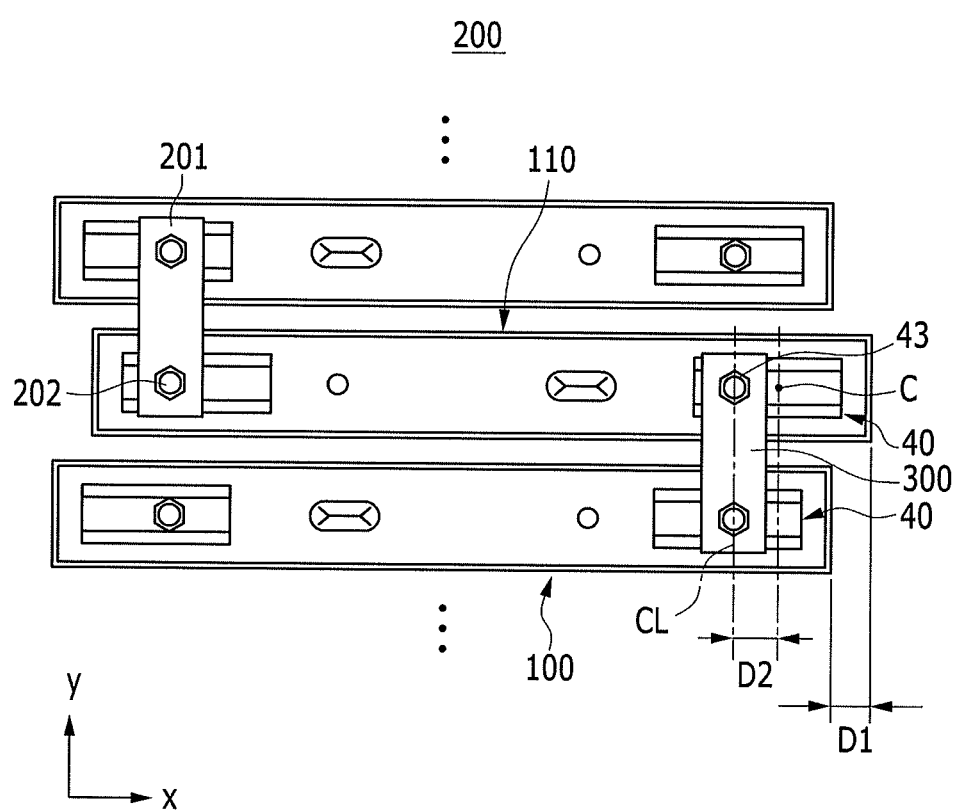
FIG. 9 illustrates a top plan view of a rechargeable battery module according to an exemplary embodiment.

FIG. 9 illustrates a top plan view of a rechargeable battery module 200 according to an exemplary embodiment. Referring to the rechargeable battery 100 of the first exemplary embodiment and FIG. 9, the rechargeable battery module 200 may include unit cells each formed of a rechargeable battery and a bus bar 201 connecting electrode terminals 40 of neighboring unit cells 100. In the electrode terminal 40, a bolt terminal 43 may be coupled to a plate terminal 42 and slidably moved in the x-axis direction.

The bus bar 201 may be disposed on the plate terminal 42 in the electrode terminal 40 and fixed by a nut 202 fastened to the bolt terminal 43. The bus bar 201 may connect the electrode terminals 40 in series or in parallel. The bus bar 201 may be disposed between a guide portion 422 and the nut 202 to electrically connect a guide portion 422 of one electrode terminal 40 with a guide portion 422 of the other electrode terminal.

For convenience, in the rechargeable battery module 200, unit cells 100 aligned in the right location, i.e., correctly, and unit cells 110 aligned in the wrong location, i.e., incorrectly, will be exemplarily described. Neighboring unit cells 100 and 110 in the rechargeable battery module 200 may be aligned maintaining a first distance D1 between respective end portions thereof. For example, the first distance D1 may represent a distance, e.g., in a length direction (x-axis direction) of the unit cell 100, between corresponding end portions of neighboring unit cells 100.

The unit cells 100 and 110 may be misaligned, e.g., the first distance D1 between the corresponding end portions may be greater than zero. However, a center of an electrode terminal 40 of a unit cell 100 that is properly positioned may be aligned with a bolt terminal 43 of an electrode terminal 40 of a unit cell 110 that is not centered appropriately, i.e., not in alignment with the unit cell 100, by moving the bolt terminal 43 of the unit cell 110. Accordingly, even when the centers of electrode terminals 40 and 40 of the unit cells 110 and 110 are not in alignment, the bus bar 201 may connect electrode terminals 40 of neighboring unit cells 100.

The bolt terminal 43 of the misaligned unit cell 110 may be moved to facilitate alignment with the electrode terminal 40 of the unit cell 100. As such, a center line CL of a bus bar 201 extending along a length (y-axis direction) of the bus bar 201 from a center of a width (x-axis direction) of the bus bar 201 may be aligned with a center C of a plate terminal 42 of the unit cell 100 and not aligned, i.e., misaligned, with a center of a plate terminal 42 of the unit cell 110. The center C of a plate terminal 42 of the unit cell 110 may be spaced from the CL by a second distance D2.

The first distance D1 and the second distance D2 may be equivalent to each other or may be different from each other, depending on locations of the bolt terminals 43 of the unit cells 100 and 110. In manufacturing the rechargeable battery module 200, the second distance D2 may be controlled with respect to the first distance D1. Accordingly, locations of the electrode terminals 40 of the unit cells 100 and 110 may be controlled, and the design of the electrode terminal 40 for manufacturing of the rechargeable battery module 200 may be simplified.

By way of summation and review, in a conventional rechargeable battery, a location of an electrode terminal is determined according to a location of the terminal hole in the cap plate. For example, the electrode terminal is aligned with the terminal hole, and the position of the electrode terminal is not adjustable. Thus, if the rechargeable batteries are misaligned in assembling of a module, the bus bar cannot be properly coupled to the electrode terminal. Accordingly the electrode terminals cannot be connected in series or in parallel. Further, if the bus bar is somehow made to join with the electrode terminal when the rechargeable batteries are misaligned, the bus bar or the electrode terminal may be stressed due to a compulsive or strained connection between the bus bar and the electrode terminal.

One or more embodiments may provide a rechargeable battery in which a position of an electrode terminal may be adjusted. Manufacturing of the rechargeable battery module may be simplified due to the design of the electrode terminal.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A rechargeable battery, comprising:
an electrode assembly;
a case, the case retaining the electrode assembly;
a cap plate coupled to an opening of the case; and
an electrode terminal coupled to the cap plate and electrically connected to the electrode assembly,
wherein the electrode terminal includes:
a terminal fixing portion coupled to an upper surface of the cap plate, the terminal fixing portion including a guide portion and a body portion, the body portion including a first length extending in a length direction of the cap plate, and a second length extending in a width direction of the cap plate and being shorter than the first length, the width direction being orthogonal to the length direction, and
a terminal portion coupled to the terminal fixing portion, and
the guide portion is configured to facilitate slidable movement of the terminal portion along a single direction.

2. The rechargeable battery as claimed in claim 1, wherein:
the body portion is on an insulator, the insulator being on the cap plate, and
the guide portion includes first portions protruding upward from opposing, upper lateral edges of the body portion and second portions extending from the first portions toward a center of the body portion, the guide portion configured to facilitate slidable movement of a lower end of the terminal portion.

3. The rechargeable battery as claimed in claim 2, wherein the terminal portion includes:
a plate portion coupled to the guide portion on the body portion, and
a bolt portion protruding from the plate portion.

4. The rechargeable battery as claimed in claim 2, wherein the second portions of the guide portion have different lengths.

5. The rechargeable battery as claimed in claim 1, wherein the guide portion extends along the length direction of the cap plate.

6. The rechargeable battery as claimed in claim 1, wherein the plate portion includes two pairs of opposing sides, each side of the plate portion being shorter than the first length of the body portion.

7. The rechargeable battery as claimed in claim 6, wherein the plate portion is square.

8. The rechargeable battery as claimed in claim 1, further including a weld on opposing second portions of the guide portion and corresponding positions of an upper surface of the plate portion.

9. The rechargeable battery as claimed in claim 1, wherein the plate portion is rectangular.

10. The rechargeable battery as claimed in claim 9, wherein a length of the plate portion is longer than the first length of the body portion.

11. The rechargeable battery as claimed in claim 10, wherein the plate portion includes a pair of bendable end portions, the bendable end portions being configured to engage opposing side surfaces of the body portion.

12. The rechargeable battery as claimed in claim 1, wherein the plate portion includes one bendable end portion, the bendable end portion being configured to engage a corresponding side surface of the body portion.

13. The rechargeable battery as claimed in claim 12, wherein the plate portion includes a welding end, the welding end opposing the bendable end portion, the welding end including a weld for connecting the plate portion to a corresponding one of the second portions.

14. The rechargeable battery as claimed in claim 12, wherein the bolt portion and the plate portion have different centers.

15. A rechargeable battery module, comprising:
a plurality of unit cells formed of rechargeable batteries, and
a bus bar connecting electrode terminals of neighboring unit cells,
wherein the electrode terminal includes:
a terminal fixing portion on each unit cell, and
a terminal portion coupled to the terminal fixing portion, the terminal portion being slidably movable in a length direction of the unit cells on the terminal fixing portion, and
the bus bar is disposed on the terminal fixing portion and coupled with the terminal portion.

16. The rechargeable battery module as claimed in claim 15, wherein:
the terminal fixing portion includes a body portion, and
the body portion includes:
a first length extending in the length direction of the cap plate, and
a second length extending in a width direction of the cap plate and being shorter than the first length, the width direction being orthogonal to the length direction.

17. The rechargeable battery module as claimed in claim 15, wherein the neighboring unit cells have a first distance between corresponding end portions of the respective unit cells.

18. The rechargeable battery module as claimed in claim 15, wherein a center line of the bus bar is in alignment with a center of a terminal portion of one unit cell and is not in alignment with a center of a terminal portion of a neighboring unit cell.

19. The rechargeable battery module as claimed in claim 15, wherein a center line of the bus bar is spaced a second distance from a center of the terminal fixing portion of the neighboring unit cell.

20. The rechargeable battery module as claimed in claim 15, wherein
the terminal fixing portion includes a guide portion on a body portion, the guide portion including first portions protruding upward from opposing, upper lateral edges of the body portion, and second portions extending toward a center of the body portion, the guide portion being configured to facilitate slidable movement of the terminal portion in a single direction,
the terminal portion including a bolt portion, the bolt portion coupled to the guide portion and protruding outside of the rechargeable battery from a plate portion coupled to the guide portion on the body portion, and
a nut disposed around the bolt portion on the bus bar and the guide portion.

* * * * *